(12) United States Patent
Genuyt et al.

(10) Patent No.: US 7,071,150 B2
(45) Date of Patent: Jul. 4, 2006

(54) BIODEGRADABLE LUBRICATING COMPOSITION AND USES THEREOF, IN PARTICULAR IN A BORE FLUID

(75) Inventors: Bertrand Genuyt, Versailles (FR); Michel Janssen, Marcinelle (BE); Rene Reguerre, Le Havre (FR); Jan Cassiers, Zoersel (BE); Francois Breye, Wolvertem (FR)

(73) Assignee: Total Raffinage Distribution S.A., Puteaux (FR)

( * ) Notice: Subject to any disclaimer, the term of this patent is extended or adjusted under 35 U.S.C. 154(b) by 316 days.

(21) Appl. No.: 10/275,302

(22) PCT Filed: Apr. 26, 2001

(86) PCT No.: PCT/FR01/01281

§ 371 (c)(1),
(2), (4) Date: May 19, 2003

(87) PCT Pub. No.: WO01/83640

PCT Pub. Date: Nov. 8, 2001

(65) Prior Publication Data

US 2004/0014616 A1    Jan. 22, 2004

(30) Foreign Application Priority Data

May 3, 2000 (FR) .................. 00 05632

(51) Int. Cl.
*C10M 129/68* (2006.01)
*C09K 8/32* (2006.01)
*C09K 8/36* (2006.01)

(52) U.S. Cl. ............... 508/463; 508/485; 507/103; 507/905

(58) Field of Classification Search ............... 508/463
See application file for complete search history.

(56) References Cited

U.S. PATENT DOCUMENTS

| | | | | |
|---|---|---|---|---|
| 5,474,714 A | * | 12/1995 | Pirck et al. | 508/463 |
| 5,635,457 A | * | 6/1997 | Van Slyke | 507/103 |
| 5,763,374 A | * | 6/1998 | Sakai et al. | 508/469 |
| 5,958,845 A | * | 9/1999 | Van Slyke | 507/103 |
| 6,018,063 A | * | 1/2000 | Isbell et al. | 554/213 |
| 6,034,037 A | * | 3/2000 | Van Slyke | 507/103 |
| 6,096,690 A | * | 8/2000 | Wittenbrink et al. | 507/103 |
| 6,107,255 A | * | 8/2000 | Van Slyke | 507/103 |
| 6,110,874 A | * | 8/2000 | Van Slyke | 507/103 |
| 6,159,907 A | * | 12/2000 | Van Slyke | 507/203 |
| 6,255,256 B1 | * | 7/2001 | Van Slyke | 507/103 |
| 6,410,488 B1 | * | 6/2002 | Fefer et al. | 507/103 |
| 6,455,474 B1 | * | 9/2002 | Wittenbrink et al. | 507/103 |
| 6,887,832 B1 | * | 5/2005 | Kirsner et al. | 507/103 |

FOREIGN PATENT DOCUMENTS

| | | | |
|---|---|---|---|
| WO | WO 95/06694 | * | 3/1995 |
| WO | WO 97/34963 | * | 9/1997 |

* cited by examiner

*Primary Examiner*—Ellen M. McAvoy
(74) *Attorney, Agent, or Firm*—Sughrue Mion, PLLC

(57) ABSTRACT

The invention concerns a biodegradable lubricating composition, based on mineral hydrocarbon oil and ester, comprising a majority amount of a mineral hydrocarbon fraction substantially free of aromatic compounds, said fraction having a normal paraffin content not more than 10 wt. % and an isoparaffin content not less than 36 wt. %, and a minority amount ranging between 5 and 40 wt. % of at least a fatty acid ester.

18 Claims, 2 Drawing Sheets

Figure 1:
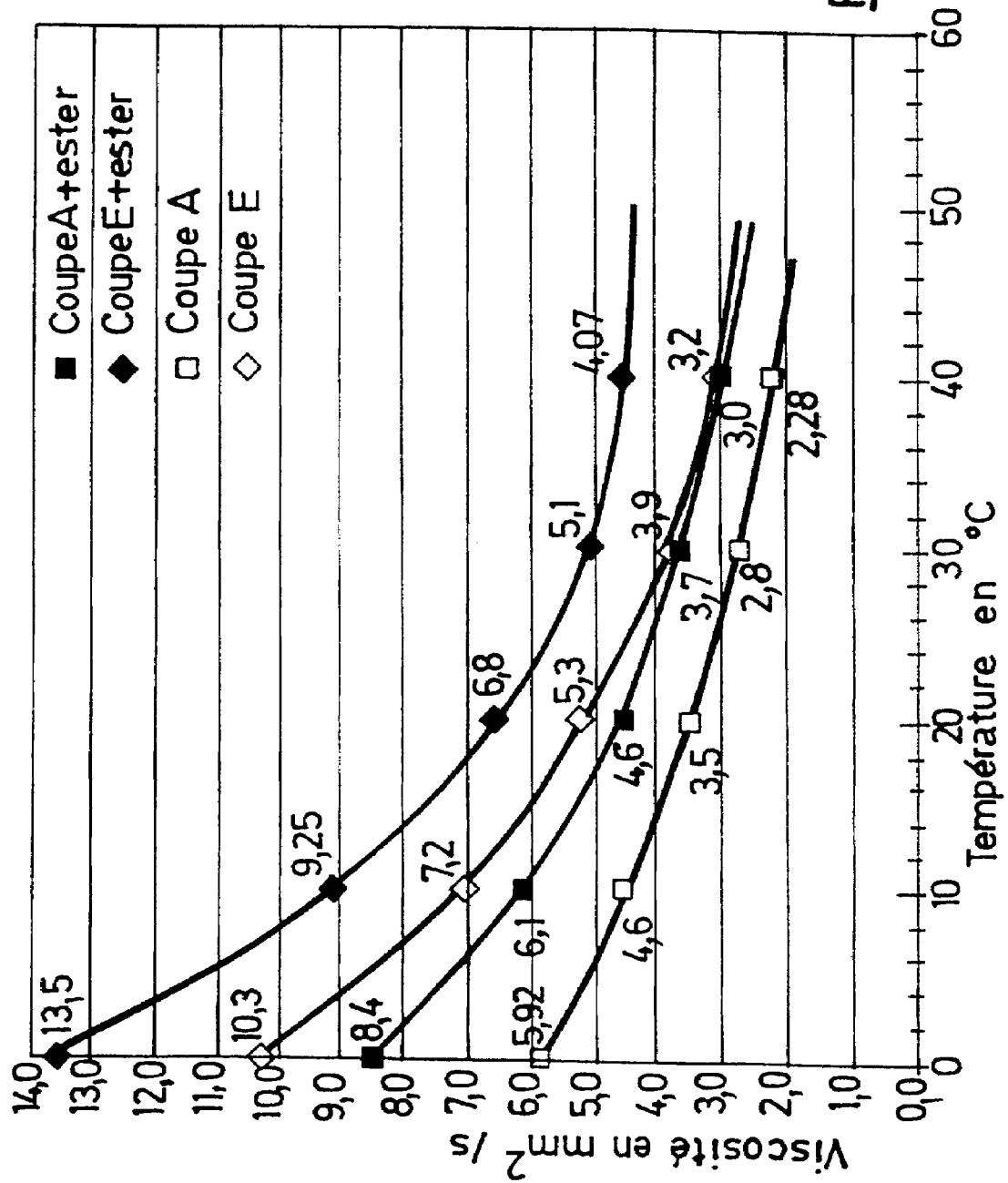

BIODEGRADABLE LUBRICATING COMPOSITION AND USES THEREOF, IN PARTICULAR IN A BORE FLUID

The invention concerns a biodegradable lubricating composition, preferably for use as a highly lubricating oil phase in a drilling fluid or mud, this composition comprising a mixture of a mineral hydrocarbon cut substantially free of aromatic compounds and a fatty acid ester. The invention also concerns the use of this composition as a continuous phase oil in an invert emulsion in a petroleum drilling fluid or mud, particularly suited to offshore drilling in deep water and/or inclined or long-range drilling.

Certain worksites, such as major civil engineering projects, always require the use of large amounts of lubricant which are then likely to be released into the environment. This is the case, for example, with drilling fluids.

Drilling has always played a major role in oil prospecting and, in the present day, drilling is deeper and deeper. Drilling technology has advanced considerably, whether on land or on the seabed, particularly in deep offshore sites, or as is the case more recently in horizontal or inclined drilling where successive gradients of one or two degrees give an incurved well trajectory. This gives rise to horizontal wells of at least one kilometre and up to ten kilometres away from the well head. The friction forces exerted are therefore much greater and hence the increased importance of a drilling fluid with good lubricating properties.

In the known art, the drilling technique uses a drill bit attached to the ends of the drilling pipe which rotates and digs the well by grinding rocks. As drilling progresses, smaller and smaller drill bits are used and, at each step, the well is strengthened using a steel tube, called casing, which is lowered into the hole then filled with cement. A drilling fluid is circulated during drilling by injection into the drill bit and is expelled in the contact zone with the rocks. It then rises to the top of the well through the annular space separating the drilling pipe from the casing.

This fluid has a number of principal functions:

it cools the drill bit, it reduces metal-metal friction between the casing and the drill bits and metal-rock friction both in the drill bit and the annular space because the fluid ascends containing ground rock particles, called cuttings, it evacuates rock debris towards the outside, it creates pressure on the walls of the hole to prevent the walls collapsing inwards, it balances pressure between the well base and the surface to maintain well control and prevent a blow-out.

In the case of offshore drilling in deep water, water temperature is about 4 to 5° C. and the viscosity of drilling fluids therefore needs to be controlled at these low temperatures.

Various types of drilling fluid or mud have been used in the past, such as water-based fluids containing water and additives to increase viscosity, oil fluids and water-in-oil or oil-in-water type emulsions, such as that described in particular in U.S. Pat. No. 2,816,073. This patent states that the oil phase can consist of different hydrocarbon fractions such as kerosene and gas oil cuts and highly alkylated and branched petroleum cuts. Unfortunately, petroleum cuts often have a high aromatic compound content and therefore present a high risk of toxicity to marine life if they are released into the sea during offshore drilling.

Petroleum cuts with reduced aromatic compound levels have also been used but are still not very biodegradable.

Deposits of these products on the seabed have led to sea-bordering countries adopting increasingly strict legislation requiring offshore drilling companies to look into the use of products that are as biodegradable and non-toxic as possible. This is particularly true of the North Sea.

Patent EP 0 667 890 thus proposes a drilling fluid with a continuous oil phase consisting of a mixture of n-alkanes with 10 to 20 carbon atoms and essentially free of other types of hydrocarbon. Unfortunately, this type of fluid has a flow point that is too high for use in low temperature zones (<5° C.).

The use of biodegradable compounds such as triglyceride esters of animal or plant fatty acids in invert emulsion drilling fluids, used as the oil phase or as a major fraction of the oil phase, has also been proposed. It was, however, found that these products have the major drawback of being extremely susceptible to hydrolysis which results in unwanted changes in the viscosity of emulsions.

Attempts were therefore made to develop other less sensitive esters. In particular, esters of saturated or unsaturated monocarboxylic acids (particularly C12–C14) and of monofunctional alcohols for use in invert emulsion drilling fluids have been proposed in patents EP 0 374 671, 0 374 672 and 0 386 636. However, these compounds are still susceptible to hydrolysis, particularly at high temperatures, especially above 160° C., as is the case in rock drilling and deep offshore drilling.

Other synthetic compounds, such as PAO (polyalphaolefins) or LAO (linear alpha-olefins) obtained by olefin oligomerisation can also be used in combination with the preceding compounds. Unfortunately, these compounds have very poor biodegradability, especially under anaerobic conditions. In addition, the use of these synthetic products considerably increases the cost price of drilling fluids.

The Applicant has surprisingly found that it is possible to obtain a lubricating composition, notably for use as the oil phase in a drilling fluid, with rheological properties and lubricating properties suited to the severe conditions of use of such fluids yet which is biodegradable. This composition is based on a mixture of appropriate proportions of a mineral hydrocarbon cut, substantially free of aromatic compounds and with a specific and unusual content in normal paraffins and isoparaffins, and a fatty acid ester The aim of the invention is therefore to propose hydrocarbon compositions which offer a satisfactory compromise between lubricating capacity, viscosity and biodegradability and to favour specific hydrocarbon cuts by using them to obtain a lubricating composition incorporated in particular as the oil phase of a drilling fluid, at an optimal cost compared to fluids based on synthetic oils.

To this end, the invention proposes a biodegradable lubricating composition based on a mineral hydrocarbon oil and ester, wherein it comprises a majority amount of 95 to 60% of a mineral hydrocarbon cut substantially free of aromatic compounds, said cut having a normal paraffin content less than or equal to 10% by weight and an isoparaffin content greater than or equal to 35% by weight and a minority amount ranging between 5 and 40% by weight of at least one fatty ester.

The advantages of such a composition are, on the one hand, cutting the cost price of drilling fluids based on such a composition and, on the other hand, maintaining relatively low flow point and kinematic viscosity at low temperatures (below 5° C.) while retaining good lubricating capacity and good biodegradability properties.

Preferably, in the lubricating composition according to the invention, the mineral cut consists of a hydrocarbon compound with between 13 and 16 carbon atoms and a distillation range between 230 and 285° C. Moreover, it advantageously has an aromatic compound content of less than 0.01% by weight.

Its flow point (according to method NF T 60105) is advantageously below or equal to −30° C. and preferably below or equal to −50° C.

In particular, the mineral cut of the composition of the invention has a flash point (according to NF M 07019) greater than or equal to 100° C.

oil phase representing between 60 and 90%. This also contains the other common additives such as, for example, emulsifiers, gelling and weighting agents. This drilling fluid is particularly well-suited to inclined drilling.

The mineral hydrocarbon cuts used in the invention are gas oil cuts resulting from hydrocracking petroleum loads with the gas oil cuts undergoing a forced hydrogenation stage to eliminate aromatic compounds followed by fractionation. Table 1 below gives certain characteristics of three cuts A, B and C used within the scope of the invention, compared to de-aromatised gas oil cuts D and E.

TABLE 1

|  | Measurement method | Cut A | Cut B | Cut C | Cut D | Cut E |
|---|---|---|---|---|---|---|
| Distillation: initial point-dry point (° C.) | NFM 07002 | 231–265 | 248–281 | 238–265 | 239–266 | 255–300 |
| Chain length |  | C13–C15, C14 major component | C14–C16 | C13–C16 | C13–C16 | C14–C18 |
| Flash point (° C.) | NFM 07019 | 101 | 112 | 103 | 103 | 116 |
| Kinematic viscosity at 40° C. (mm²/s) | NF T 60100 | 2.3 | 2.85 | 2.4 | 2.36 | 3.3 |
| Flow point (° C.) | NF T 60105 | −51 | −40 | −30 | −25 | −15 |
| Aromatic level (% by weight) | UV method | <0.01 | <0.01 | 0.3 | 0.5 | 0.9 |
| Composition (%) | mass spectrometry |  |  |  |  |  |
| - n-paraffins |  | 3 | 5 | 10 | 16 | 27 |
| - i-paraffins |  | 44 | 50 | 36 | 30.5 | 19 |
| - naphthenes |  | 53 | 45 | 53.7 | 53 | 53.1 |
| - aromatics |  | 0 | 0 | 0.3 | 0.5 | 0.9 |

The mineral cut also preferably has a kinematic viscosity at 40° C. (according to method NF T 60100) between 2.2 and 2.9 mm²/s and, more advantageously below 2.5 mm²/s.

In a preferred embodiment of the invention, the mineral cut has a distillation range between 230 and 265° C., consists of hydrocarbons with 13 to 15 carbon atoms with a majority content in C14 hydrocarbons and has a flow point of −51° C.

The ester of the lubricating composition according to the invention can be obtained from saturated or unsaturated monocarboxylic acids with 8 to 24 carbon atoms and from monofunctional alcohols with 1 to 12 carbon atoms and/or polyfunctional alcohols with 2 to 6 carbon atoms.

The ester used in the invention is preferably obtained from rapeseed fatty acids and an alcohol such as 2-ethyl hexanol.

According to the invention, the amount of ester added to the composition is between 10 and 30% by weight.

The lubricating composition according to the invention has a kinematic viscosity at 40° C. (according to method NF T 60 100) of 2 to 4.5 mm²/s.

The lubricating composition as defined above has an anaerobic biodegradability level in excess of 30%, measured according to ISO standard 11734.

A second aim of the invention concerns the use of the lubricating composition according to the invention as the continuous phase oil of an invert emulsion drilling fluid or mud, the oil phase representing between 60 and 90% by volume of the drilling fluid. This also contains the other common additives such as, for example, emulsifiers, gelling and weighting agents. This drilling fluid is particularly well-suited to offshore drilling.

Another aim of the invention concerns the use of the lubricating composition according to the invention as the continuous phase oil of an invert emulsion drilling fluid, , the Gas oil cuts A, B and C are particularly well-suited to use in the lubricating composition of the invention as their flow point is below −30° C. and they have a much reduced n-paraffin content (below 10% by weight), a high iso-paraffin content (over or equal to 36% by weight) and a very low aromatic compound content compared to other common gas oil cuts such as D and E.

Another advantage of using a close cut like cut A, whose gas chromatography analysis essentially shows one dominant C14 peak, is that there is no contamination by the base oil containing the cut, added to a drilling mud, when samples of the fluid from the drilling process are analysed using the same method.

As indicated above, the esters which can be used to produce the lubricating composition according to the invention are obtained from saturated or unsaturated monocarboxylic acids comprised of 8 to 24 carbon atoms and monofunctional alcohols with 1 to 12 carbon atoms and/or polyfunctional alcohols with 2 to 6 carbon atoms.

Esters obtained from monofunctional alcohols include, in particular, methyl cocoate, methyl oleate, isopropyl oleate, n-butyl oleate, isobutyl oleate, isobutyl stearate, ethylhexyl caprylate, ethylhexyl caprate, ethylhexyl cocoate, ethylhexyl oleate, ethylhexyl linoleate, ethylhexyl adipate, ethylhexyl sebacate, n-octyl adipate or mixtures of these compounds. Preferred esters obtained from polyfunctional alcohols are hexanediol and hexanediol di-2-ethylhexanoate.

All these esters have kinematic viscosities at 40° C. of 1 to 12 mm²/s (1 to 12 cSt).

An advantageous ester for generating the lubricating composition is a mixture of esters obtained by reacting 2-ethyl hexanol with fatty acids extracted from rape oil (mainly oleic acid and linoleic acid), sold under the brand name Finagreen® BMDF by TOTALFINA.

Its main properties are as follows:
kinematic viscosity at 40° C. between 6 and 8 mm²/s (according to method DIN 51562)
flow point: <−30° C. (according to method ASTM D97-87),
flash point: >150° C. (according to method ASTM D92).

It is known that highly de-aromatised mineral hydrocarbon cuts (especially gas oil) lose much of their lubricating power. This is why it is of interest to note that adding about 30% by weight of esters such as Finagreen® BMDF to cuts A, B and C reduces friction forces by 30% in lubricating compositions obtained in this way.

Measurements of changes in kinematic viscosity as a function of temperature of cuts A and E on the one hand and of a mixture consisting of 70% by weight of these cuts and 30% by weight of Finagreen® BMDF, on the other hand, are given in Table 2.

TABLE 2

|  | Viscosity mm²/s | | | | |
| --- | --- | --- | --- | --- | --- |
| Temperature (° C.) | 0 | 10 | 20 | 30 | 40 |
| Cut A | 5.92 | 4.6 | 3.5 | 2.8 | 2.28 |
| Cut E | 10.3 | 7.2 | 5.3 | 3.9 | 3.2 |
| Cut A + ester | 8.4 | 6.1 | 4.6 | 3.7 | 3.0 |
| Cut E + ester | 13.5 | 9.25 | 6.8 | 5.1 | 4.07 |

These values show that the viscosity of Cut A+ester increases from 3 mm²/s at 40° C. to 8.4 mm²/s at 0° C. This demonstrates that the mixture of the invention has rheological properties adapted to the low temperature conditions encountered in deep water drilling since the maximum kinematic viscosity threshold at a temperature of 0° C. must be less than 10 mm²/s for a drilling fluid.

In addition, anaerobic biodegradability tests after 60 days (ISO standard 11734: water quality, evaluation of the "ultimate" biodegradability of organic compounds in digesting muds) were performed on mixtures of mineral cut A and Finagreen® BMDF ester, with varying percentages of the latter being added to the composition. The percentage degradability of organic compounds is expressed in comparison to a reference substance, sodium benzoate, and to cellulose. The results are given in Table 3 hereafter.

TABLE 3

| % ester in the mixture | % biodegradability/sodium benzoate | % biodegradability/cellulose |
| --- | --- | --- |
| 10 | 24 | 38.5 |
| 30 | 32 | 51.4 |
| 50 | 38 | 61 |
| 100 | 60° | 96.3 |

For greater clarity, the results given in Tables 2 and 3 are illustrated by the drawings in the appendix where:

FIG. 1 presents a set of graphs illustrating change sin viscosity as a function of temperatures in Table 2.

Figure 2:
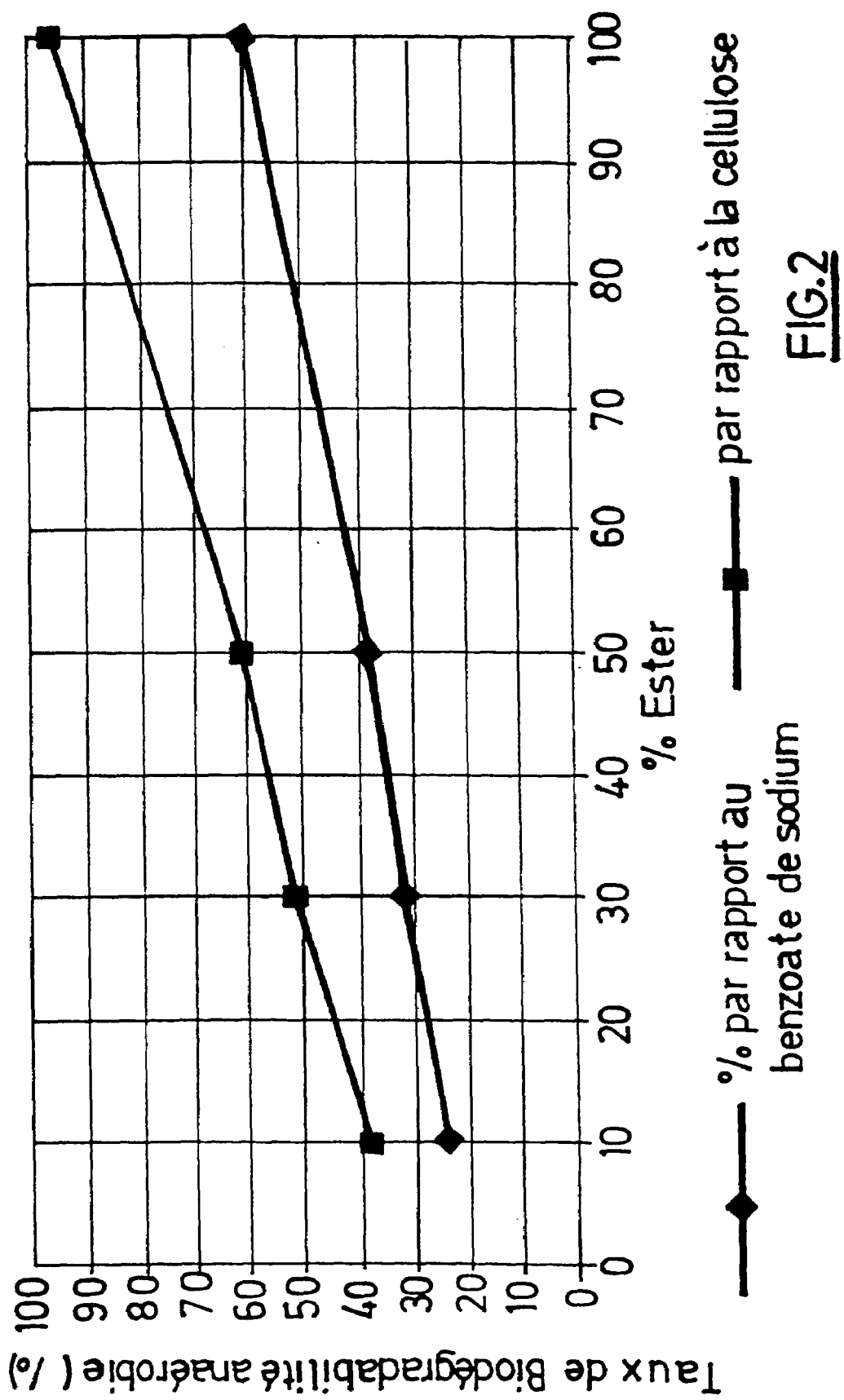

FIG. 2 presents the graphs illustrating the results of anaerobic degradability in Table 3.

In this figure, the upper graph represents the percentage conversion of the lubricating composition compared to that of cellulose while the lower graph refers to percentage conversion with respect to sodium benzoate. It can be seen that adding 30% of esters to the mixture with the mineral cut gives a biodegradability level of 32% which is actually half of that of the pure ester but much better than that of the pure mineral cut (about 6%).

Below about 5% ester in the mixture, the level of biodegradability of the composition is below 20%, which is too low.

Over about 30% ester in the mixture, the high cost of such a composition makes it less attractive.

As an example of the use of a lubricating composition according to the invention as the continuous phase oil of an invert emulsion drilling fluid or mud for offshore drilling in deep water, a suitable mud formulation is as follows:

| lubricating composition: | 500 to 600 ml |
| --- | --- |
| Emulsifier 1: | 20 to 30 ml |
| Emulsifier 2: | 10 to 20 ml |
| Brine: | 250 to 300 ml |
| Lime: | 5 to 15 g |
| Gelling agent: | 10 to 20 g |
| Weighting material: | 100 to 600 g. |

This lubricating composition can also be used in a drilling mud in water to which it is added at a rate of 5% by volume.

The invention claimed is:

1. Biodegradable lubricating composition, based on mineral hydrocarbon oil and ester, comprising a majority amount of between 95 and 60% by weight of a mineral hydrocarbon fraction substantially free of aromatic compounds, said fraction having a normal paraffin content of not more than 10% by weight and an isoparaffin content not less than 35% by weight and a minority amount ranging between 5 and 40% by weight of at least one fatty ester, wherein the mineral cut has a flow point (according to method NF T 60105) below or equal to −30° C., and wherein the mineral hydrocarbon oil comprises at least 45% naphthenes.

2. Lubricating composition according to claim 1, wherein the mineral cut consists of hydrocarbons with 13 to 16 carbon atoms having a distillation range between 230 and 285° C.

3. Lubricating composition according to claim 1, wherein the mineral cut has an aromatic compound content of less than 0.0 1% by weight.

4. Lubricating composition according to claim 1, wherein the mineral cut has a flow point (according to method NF T 60105) below or equal to −50° C.

5. Lubricating composition according to claim 1, wherein the mineral cut has a flash point (according to NF M 07019) greater than or equal to 100° C.

6. Lubricating composition according to claim 1, wherein the mineral cut has a kinematic viscosity at 40° C. (according to method NF T 60100) between 2.2 and 3 mm²/s.

7. Lubricating composition according to claim 1, wherein the mineral cut has a distillation range between 230 and 265° C., consists of hydrocarbons with 13 to 15 carbon atoms with a majority content in C14 hydrocarbons and has a flow point of −51° C.

8. Lubricating composition according to claim 1, wherein the ester is obtained from saturated or unsaturated monocarboxylic acids with 8 to 24 carbon atoms and from monofunctional alcohols with 1 to 12 carbon atoms and/or polyfunctional alcohols with 2 to 6 carbon atoms.

9. Lubricating composition according to claim 8, wherein the ester is obtained from rapeseed fatty acids and an alcohol.

10. Lubricating composition according to claim 1, wherein the amount of ester added to the composition is between 10 and 30% by weight.

11. Lubricating composition according to claim 1, wherein it has a kinematic viscosity at 40° C. (according to method NF T 60 100) of 2 to 4 mm$^2$/s.

12. Lubricating composition according to claim 1, wherein it has an anaerobic biodegradability level of over 30% (according to ISO standard 11734).

13. An invert emulsion drilling fluid or mud, comprising the lubricating composition according to claim 1 as a continuous phase oil, wherein the lubricating composition represents between 60 and 90% by volume of the drilling fluid or mud.

14. The drilling fluid or mud according to claim 13, further comprising one or more additives selected from the group consisting of emulsifiers, gelling agents, and weighting agents.

15. The drilling fluid or mud according to claim 13, wherein the drilling fluid or mud is a drilling fluid or mud for offshore drilling in deep water.

16. The drilling fluid or mud according to claim 13, wherein the drilling fluid or mud is a drilling fluid or mud for inclined or long-range drilling.

17. Lubricating composition according to claim 1, wherein the mineral cut has a kinematic viscosity at 40° C. (according to method NF T 60100) below or equal to 2.5 mm$^2$/s.

18. Lubricating composition according to claim 8, wherein the alcohol is 2-ethyl hexanol.

* * * * *